United States Patent [19]

Adam et al.

[11] 4,127,885
[45] Nov. 28, 1978

[54] OVER-CURRENT PROTECTION CIRCUIT FOR VOLTAGE REGULATOR

[75] Inventors: Kenneth C. Adam, Thousand Oaks; Finis C. Easter, Canoga Park, both of Calif.

[73] Assignee: RCA Corporation, New York, N.Y.

[21] Appl. No.: 789,654

[22] Filed: Apr. 21, 1977

[51] Int. Cl.² .................................................. H02H 7/20
[52] U.S. Cl. ..................................................... 361/18
[58] Field of Search ............... 361/18, 74, 98; 323/17, 323/DIG. 1

[56] References Cited

U.S. PATENT DOCUMENTS

| | | | |
|---|---|---|---|
| 3,988,643 | 10/1976 | Morris | 361/18 |
| 4,013,925 | 3/1977 | Tice et al. | 361/18 |
| 4,017,789 | 4/1977 | Morris | 361/18 X |

FOREIGN PATENT DOCUMENTS 1,513,287  4/1970  Fed. Rep. of Germany ............. 361/18

*Primary Examiner*—Harry E. Moose, Jr.
*Attorney, Agent, or Firm*—H. Christoffersen; A. L. R. Limberg

[57] ABSTRACT

A control transistor in the over-current protection circuitry of a voltage regulator is connected in a regenerative latch circuit with a complementary-conductivity auxiliary transistor, whereby conduction once initiated in said control transistor tends to be sustained. This avoids the tendency towards rapid oscillation between shut-down and power-up conditions in the over-current protection circuitry. The regenerative latch circuit loads the capacitor that supplies its sustaining current so heavily that the potential thereacross decays, the decay finally advancing to the point where regeneration halts. The resulting non-conduction of the control transistor permits the voltage regulator to attempt to resume the power-up condition. The present invention is an improvement in such a voltage regulator wherein circuitry is provided for rapidly recharging the capacitor for supplying sustaining current during this attempt. The recurrence of this cycle during short-circuit loading conditions leads to a relaxation oscillator mode of operation with the power-up duty cycle being sufficiently low that the components of the voltage regulator are kept from being damaged by overheating.

3 Claims, 1 Drawing Figure

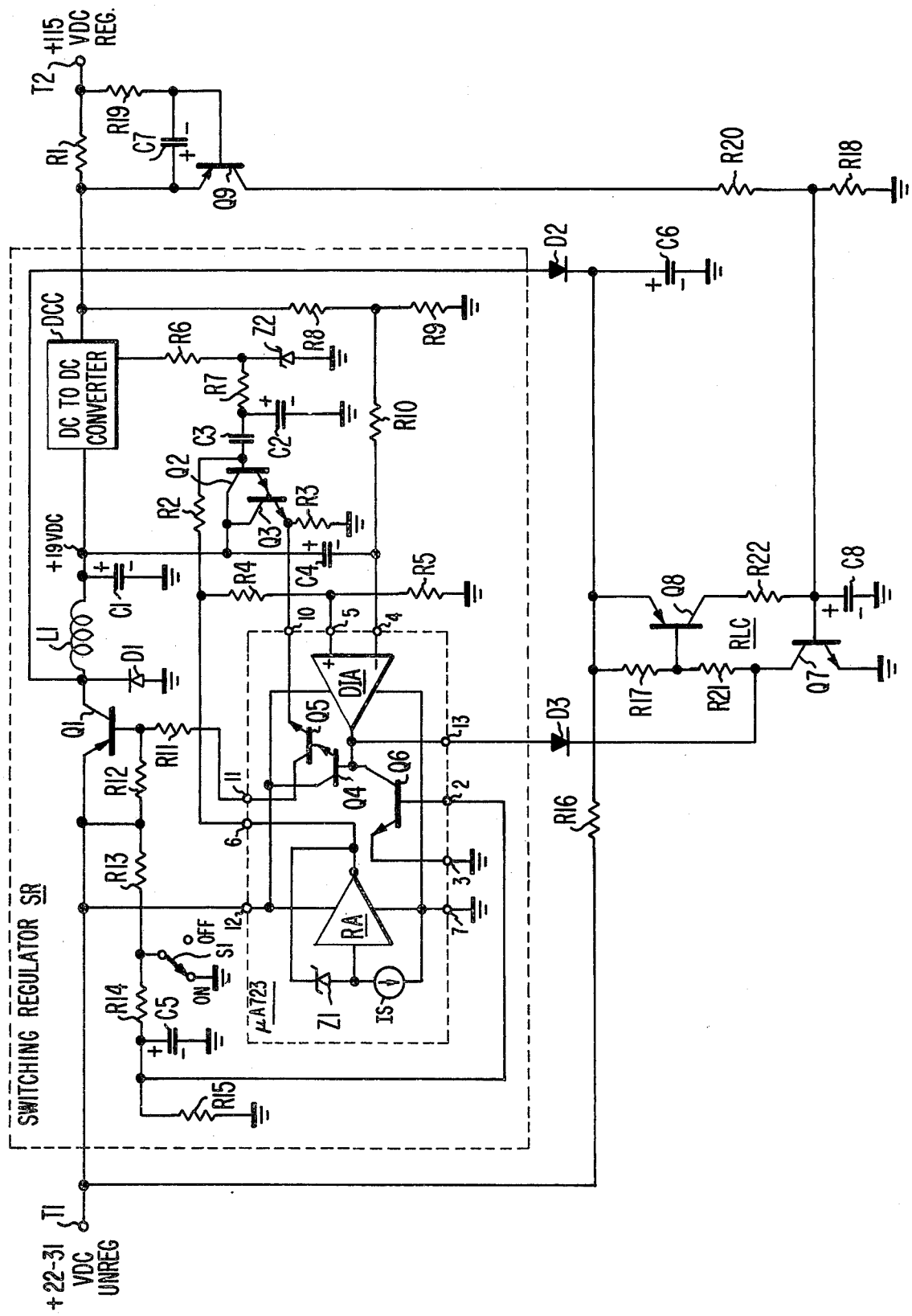

OVER-CURRENT PROTECTION CIRCUIT FOR VOLTAGE REGULATOR

The present invention relates to voltage regulators provided with over-current protection circuitry, which permits their output terminals to be short-circuited without damage to the voltage supply.

The present invention is embodied in such a voltage regulator wherein the over-current protection circuitry includes a control transistor biased into conduction when an over-current condition is sensed for controlling shut-down of the voltage supply. Further, the control transistor is provided with a regenenative feedback connection from its output electrode to its input electrode to suppress the cycling of the voltage regulator between its shut-down and power-up conditions. The control transistor and its regenerative feedback connection are arranged to operate as a relaxation oscillator to attempt periodically to re-establish a power-up condition, after a shut-down condition has been established.

The sole FIGURE of the drawing shows a regulated voltage supply provided over-current protection, embodying the present invention.

The regulated voltage supply shown in the drawing includes a switching regulator SR receptive of an unregulated +22-31 VDC applied to terminal T1. SR includes a series pass transistor Q1; a low-pass or smoothing filter comprising flyback diode D1, a series-arm inductor LI, and a shunt-leg capacitor C1; and a d-c-to-d-c converter DCC for converting the +19VDC or so appearing at the output of the low-pass filter to a higher potential substantially equal to +115VDC. This voltage is applied by way of a current sensing resistor R1 to a terminal T2, used for connecting to further circuitry.

The switching regulator SR is shown including a μA723 integrated voltage regulator circuit manufactured by Fairchild Semiconductor and by Texas Instruments, Inc., amongst others. Pin 7 of the μA723 is grounded, and pin 12 of the μA723 is connected to receive positive operating potential from T1. These connections supply operating power to a reference amplifier RA and a differential-input error amplifier DIA included in the μA723. Reference amplifier RA is an inverting amplifier provided with degenerative voltage feedback from output to input by means of an avalanche diode Z1 biased into avalanche by a current source IS. The feedback operates to sum the positive-temperature-coefficient avalanche breakdown voltage of Z1 with the negative-temperature-coefficient emitter-to-base offset potential of a grounded-emitter input transistor in reference amplifier RA to provide a temperature-independent offset potential of about 7 volts between pins 7 and 6 of the μA723.

The direct potential at pin 6 is applied via resistor R2 as quiescent base potential to a transistor Q2, followed in Darlington cascade by a transistor Q3. Q2 and Q3 are located outside the μA723.

A triangular waveform voltage is superimposed on the quiescent base potential applied to the base electrode of Q2. This voltage is developed in the particular voltage regulator shown in the drawing by proceeding from a square wave available from the d-c-to-d-c converter DCC. A square wave voltage of normalized amplitude is obtained from this wave using a clipping network that comprises resistor R6 and avalanche diode Z2. A triangular wave voltage response to the normalized square wave is developed in the integrating network that comprises series-arm resistor R7 and shunt-leg capacitor C2, and this triangular response is coupled by capacitor C3 to the base electrode of Q2. The μA723 includes a direct-coupled cascade connection of transistors Q4 and Q5 similar to a Darlington cascade. A resistor R3 connects the interconnected emitter electrodes of Q3 and Q5 to ground. When the voltage at the output of error amplifier DIA, dependent upon the relative potentials at pins 4 and 5 of the μA723, exceeds the base potential of Q2 by several tens of millivolts, Q5 will be switched into conduction. The potential across R3 will be determined by the output voltage of the error amplifier DIA as diminished by the consecutive emitter-follower actions of Q4 and Q5. The emitter current of Q5 flowing through R3 is determined by Ohm's Law. On the other hand, when the base potential of Q2 exceeds the voltage at the output of error amplifier DIA by several tens of millivolts, Q5 is switched out of conduction and the potential across R3 will be determined by the base potential of Q2 as diminished by the consecutive emitter-follower actions of Q2 and Q3. Collector current demand by Q5 is coupled via a current-limiting resistor R11 to resistor R12 causes a potential drop across R12 that forward-biases the base-emitter junction of Q1 conditioning it for conduction to allow drawing of energy from input terminal T1 by the smoothing filter comprising L1, C1.

The direct potential at pin 6 is also divided by a resistive potential divider comprising resistors R4 and R5 for applying a divided direct potential to pin 5 of the μA723, connected to the non-inverting input terminal of the error amplifier DIA. The potential at the output of d-c-to-d-c converter DCC (which may in low-voltage supplies be replaced by direct connection) is divided by a resistive potential divider comprising resistors R8 and R9 and applied via resistor R10 to pin 4 of the μA723, connected to the inverting input terminal of the error amplifier DIA. The divided output potential of converter DCC, applied to the inverting input terminal of error amplifier DIA, is compared in DIA with the fixed potential applied to its non-inverting input terminal. The output voltage of error amplifier DIA increases, depending upon the amount that the fixed potential applied to pin 5 of the μA723 exceeds the divided-down output potential of converter DCC applied to pin 4 of the μA723, to increase the duration of the demand for collector current by Q5 (and to increase the amplitude of this demand also by a slight amount, although the regulator gain is so high that little potential change occurs across R3 and it behaves substantially as a constant current generator). The increased duration of the demand by Q5 for collector current correspondingly increases the duration of conduction through Q1 providing more energy to the smoothing filter L1, C1; increasing the input voltage to the converter DCC; and so increasing the output voltage from DCC to be divided and applied to pin 4 of the μA723. This reduces the difference in the potential between pins 4 and 5, so the feedback connection thus completed can be seen to be degenerative in nature, acting to stabilize the voltage at the output of the converter DCC.

Capacitor C4 by-passes the converter DCC so it does not appear in the a-c portion of the regenerative loop governing the switching of the regulator SR. This is done because the transformer conventionally included within the d-c-to-d-c conversion circuitry DCC introduces excess phase shift that adversely affects loop stability if the converter DCC is not by-passed for a-c.

The description of the operation of switching regulator SR as thusfar described presumes the switch S1 to be in its "ON" position. This results in pins 3 and 2 of the μA723, respectively connected to the emitter and base electrodes of a current limiting transistor Q6, both being at ground potential. Under these conditions, Q6 is not biased into conduction and does not interfere with the application of the output voltage of error amplifier DIA to the base of Q4. Placing S1 into its off position permits current to flow through resistors R13 and R14 to charge capacitor C5 to a sufficiently positive potential to forward-bias the base-emitter junction of current limiting transistor Q6, causing Q6 to demand sufficient current to reduce the output voltage of error amplifier DIA so as to remove Q4 and Q5 from conduction. The lack of collector current demand by Q5 reduces the potential drop across R12 substantially to zero, removing forward-bias from the base-emitter junction of Q1. Q1 is then kept non-conductive so the input voltage and consequently the output voltage of converter DCC drops to zero. Resistor R15 acts together with R13 and R14 as a potential divider for d-c, keeping the potential across C5 within such bounds that a lower voltage capacitor can be used. C5 is included in the on-off circuitry of the regulator to provide immunity against the pick-up of noise and transients on pin 2 of the μA723.

As thusfar described, the voltage supply shown in the drawing has been presumed to be normally loaded with a relatively high impedance load at terminal T2. This voltage supply was designed to be used to supply an SCR modulator circuit used to generate modulation pulses transformer coupled to the magnetron in a radar transmitter/receiver. The modulator may periodically malfunction to place short-circuit loading to ground on the supply. The short-circuit loading usually persists only so long as power continues to be supplied, so a voltage supply is desired that shuts itself down responsive to short-circuit loading, both for its own protection and for interruption of SCR conduction as a step in restoring the modulator circuit to normal operation, and thereafter recurrently initiates resumption of the power-up mode of operation in which power is supplied to the SCR modulator circuit. The present invention provides response of this nature to short-circuit loading as follows.

Assume that at the outset of the operation of the voltage regulator, its output terminal T2 is not short-circuited to ground. Initially, capacitor C6 is rapidly charged via D2 to the input voltage applied to the d-c-to-d-c converter DCC. Slower charging ensues via resistor R16 to the full unregulated direct voltage applied to input terminal T1 of the voltage supply. An NPN "control" transistor Q7 and a PNP "auxiliary" transistor Q8 are connected collector-to-base with each other in a regenerative latch circuit RLC with their respective emitter electrodes connected to opposite plates of capacitor C6. Although Q7 and Q8 are in a regenerative latch configuration, Q7 has no forward bias applied to its base-emitter junction absent a potential drop occurring across resistor R18 responsive to collector current flow from transistor Q8 or transistor Q9, and Q8 has no forward bias applied to its base emitter junction absent a potential drop occurring across resistor R17 responsive to a portion of the collector current demand of Q7. Once conduction is established in either of transistors Q7 and Q8, however, the portion of its collector current applied to the base electrode of the other initiates the regenerative condition where Q7 and Q8 tend to bias each other into continually increasing conduction.

The relatively large current associated with short-circuiting terminal T2 to ground causes a potential drop across sensing resistor R1 that is sufficiently large when coupled through the low-pass transient-suppressing filter comprising series-arm resistor R19 and shunt-leg capacitor C7 to forward-bias the base-emitter junction of transistor Q9. That is, Q9 is arranged for operation as a threshold detector, supplying collector current when the current through R1 exceeds a prescribed value. The resulting conduction of Q9 causes it to supply collector current, flowing through resistor R20 to resistor R18 and capacitor C8, charging C8 sufficiently to forward-bias the base-emitter junction of transistor Q7. Accordingly, Q7 presents a demand for collector current coupled through R21 to resistor R17 to increase the potential drop across R17 sufficiently to forward bias the base-emitter junction of Q8. Q8 responds to supply a collector current that regeneratively increases the potential drop across R18 that forward-biases the base-emitter junction of Q7, the collector electrode of Q8 being connected to the base electrode of Q7 via a current-limiting resistor R22. The increased collector demand of Q7 causes sufficient drop across the serially connected resistors R17 and R21, that the resulting lowered collector potential of Q7 forward-biases diode D3, pulling down the output potential of error amplifier DIA applied to the base of Q4. The output potential of error amplifier DIA is clamped to a voltage somewhat more positive than ground, equal to the offset potential across forward-biased diode D3 and the saturation potential of Q7. Q4 and Q5 are thus switched out of conduction. Since Q5 then no longer demands collector current, the potential drop across R12 is reduced substantially to zero, whereupon Q1 is no longer biased for conduction.

While it appears that it should be possible to have the over-current sensing bias the control transistor Q7 into conduction to clamp the output of the error amplifier DIA to a lowered potential without need for an auxiliary transistor Q8 and resistive elements R17, R21 and R22 that make up the rest of the regenerative latch circuit RLC, it has been found that such a connection undesirably tends to rapidly oscillate between shutdown and power-up conditions, permitting damage to either or both of the voltage supply and the circuitry it supplies. Connecting R21, R17, Q8 and R22 with Q7 to form the regenerative latch circuit RLC provides the sustained commitment to shut-down operation that is required to make the shut-down condition last long enough so that the power-up duty cycle during which the voltage regulator operates with short-circuit load is short enough to forestall the aforementioned damage.

With Q1 no longer conductive, its collector potential becomes less positive, further reverse biasing D2, so capacitor C6 can be charged only through the charging resistor R16. The simultaneous conduction of Q7 and Q8 in the regenerative loop circuit discharges C6 at a faster rate than it can be charged via charging resistor R16, however, so the potential across C6 decays in accordance with Coulomb's Law. When the regenerative latch circuit RLC is operative, Q7 and Q8 are placed into saturated conduction, so the end of R21 remote from its connection to R17 is clamped to the ground potential applied to the negative plate of C6, and the end of R22 remote from its connection to R18 is clamped to the potential at the positive plate of C6. This allows one to view the effective resistance the regenerative latch circuit RLC, when operative, places across C6 as being substantially equal to $R_{21}R_{22}/(R_{21}+R_{22})$ where $R_{21}$ and $R_{22}$ are the resistances of resistors R21 and R22, respectively. One may judge how the potential applied to terminal T1 tends to divide between resistor R16 and this effective resistance, once C6 is discharged, to determine the lower limit potential towards which C6 discharges. Then, knowing the effective resistance one can establish the rate at which the voltage across C6 decays towards the lower limit potential.

The limit value of potential across C6 is never reached in practice, however. The resistances R17 and R18 of R17 and R18, respectively, are chosen vis-a-vis, R21 and R22 so that potential division between R17 and R21 and that between R18 and R22 result in potential drops across R17 and R18 that are insufficiently large to sustain the conduction of Q7 and Q8 as the potential across C6 decays towards its limit value. So transistors Q7 and Q8 drop out of conduction. Cessation of conduction through Q7 ends conduction through D3 and the clamping of the output of error amplifier DIA to a lowered potential. The resumption of the application of the output voltage of error amplifier DIA to forward bias the base electrode of Q4 causes Q5 to demand collector current. This demand is met by means of current flow via R12 and R11, causing a potential drop across R12 sufficiently large that applied as the base-to-emitter potential of Q1, Q1 is biased into conduction.

If terminal T2 is no longer subjected to an over-current load condition (e.g., because the SCR in a modulator load has turned itself off responsive to lack of continuing forward current), the switching regulator SR resumes normal operation, without interference from the over-current protection circuitry so long as the short-circuit-to-ground loading of terminal T2 remains absent.

On the other hand, terminal T2 may remain subjected to an over-current load condition due to a continuing fault in the modulator or other loading on the supply. If so, the cycle of shut-down and subsequent power-up will repeat itself, establishing a relaxation oscillator mode of operation. The ability to repeat this cycle depends in substantial measure upon being able to recharge C6 quickly once the regenerative loop circuit RLC is no longer operative to maintain Q7 and Q8 conductive. The switching on of Q1 responsive to this condition clamps its collector electrode to the input potential applied to T1, forward-biasing diode D2 to rapidly restore the potential on the positive plate of capacitor C6 to a potential less positive than the collector potential of Q1 only by the small offset voltage across the diode. Then, if terminal T2 is still short-circuited to ground, the regenerative action of the regenerative latch circuit RLC in maintaining conduction of Q7 and Q8 can be sustained for the amount of time required to discharge C6 from a potential nearly equal to its upper limit potential to its lower limit potential.

The delays in smoothing filter comprising L1 and C1, in the d-c-to-d-c converter DCC, in the low-pass filter connection of R19 and C7, and in the low-pass filter connection of R20, R18, C8 delay the application to Q7 of forward emitter-to-base potential sufficient to cause conduction thereof, which application is made responsive to over-current conditions at T2, for a long enough time to permit C6 to be substantially fully charged via diode D2 when Q1 is switched into conduction. Indeed, if this delay is sufficiently long, it is possible to include a current limting resistor (e.g., 100 ohms in value) in series with diode D2 to limit peak charging currents and thus ease the operating conditions on Q1 and D2, even though the current limiting resistor slows the charging of C6. These low pass filter connections also afford considerable immunity against transients and noise being coupled into the over-current protection circuitry.

Typical element values for the regulator shown in the drawing are tabulated directly hereinafter, the resistor values being in ohms.

| R1 | 1.5 | R12 | 220 | C1 | 47μF |
|---|---|---|---|---|---|
| R2 | 100K | R13 | 22K | C2 | 10nF |
| R3 | 270 | R14 | 22K | C3 | 4700pF |
| R4 | 3600 | R15 | 4700 | C4 | 10μF |
| R5 | 10K | R16 | 180K | C5 | 1μF |
| R6 | 1K | R17 | 4700 | C6 | 22μF |
| R7 | 22K | R18 | 220 | C7 | 4.7μF |
| R8 | 56K | R19 | 1K | C8 | 1μF |
| R9 | 2700 | R20 | 22K | | |
| R10 | 43K | R21 | 22K | L1 | 800μH |
| R11 | 470 | R22 | 10K | Z2 | 33 volts |

While the present invention has been described in terms of its application to a switching regulator where the conduction of a series-pass transistor is discontinuously varied by switching, it has equal application to conventional series regulators where the conduction of the series-pass transistor is continuously varied over a range of analog values. Such a circuit can be derived simply from that shown in the FIGURE by arranging for pin 10 of the μA723 to receive a fixed bias voltage and dispensing with Q2, Q3, R2, R3, R6, Z2, C2 and C3. Rapid pull-up of C6 by Q1, D2 is not feasible in the modified regulator. An attractive alternative, for example, is to omit D2 and use a PNP transistor connected at its emitter electrode to T1, connected at its collector electrode to the positive plate of C6, and connected at its base electrode to be biased for conduction except when pin 13 of the μA723 is clamped to ground.

The present invention may also be adapted for use in shunt regulators where dissipation in the regulator transistor during short-circuit loading is reduced by placing it into a fully-conductive condition with substantially zero potential across it, rather than by placing it into a non-conductive condition with zero current through it as in a series regulator circuit.

The present invention is adapted for use with a plurality of current sensors such as that provided by R1, Q9, R19 and C7 arranged to sense current conditions in respective separate outputs of the d-c-to-d-c converter, where the converter is designed to provide more than one output voltage. The output currents of the sensors, corresponding to the collector currents of Q9 and its counterparts are summed together for application to the parallel connection of R18 and C8 to develop emitter-to-base potential for Q7.

One skilled in the art and armed with the foregoing teaching should be readily able to design and construct alternative forms of voltage regulators of the sort described in the preceeding paragraphs, and this should be borne in mind when construing the scope of the claims.

What is claimed is:

1. In a voltage regulator including: first and second load terminals; a source of input current referred to said first load terminal; regulating transistor means having a first, control electrode and having second and third electrodes and a controlled principal conduction path therebetween, the conduction of said principal conduction path being controlled responsive to the potential appearing between the first and second electrodes of said regulating transistor means; means for connecting the controlled principal conduction path of said regulating transistor means to control the flow of current from said source of input current to said load terminals, thereby to control the potential appearing between said load terminals; means for generating a current responsive to said potential appearing between said load terminals; current-to-voltage converting means for applying a potential between the first and second electrodes of said regulating transistor, the magnitude of which potential is responsive to current received from said means for generating a current; threshold detection means connected to respond to current flow through one of said first and said second load terminals exceeding a prescribed level to supply a current indicative of said excess; a first resistor connected to conduct said current indicative of said excess for developing a voltage thereacross indicative of said excess; a control transistor having an emitter electrode connected to said first load terminal, having a base electrode between which and said first load terminal said voltage indicative of said excess is applied and having a collector electrode connected for satisfying its collector current demand if any by diverting a portion of the current from said means for generating current away from said current-to-voltage converting means; a capacitor having a first plate connected to said first load terminal and having a second plate; a charging resistance connecting said source of input current to the second plate of said capacitor; and an auxiliary transistor of complementary conductivity type to said control transistor, said auxiliary transistor having an emitter electrode connected to the second plate of said capacitor, having a base electrode to which the collector electrode of said control transistor is connected and having a collector electrode connected to the base electrode of said control transistor, whereby said auxiliary transistor is included in a direct-coupled regenerative feedback connection from the collector electrode of said control transistor to its base electrode, said regenerative feedback connection being operative so long as the potential between the respective emitter electrodes of said control and auxiliary transistors is sufficiently large to sustain conduction in those transistors, the combined conduction tending to discharge said capacitor more rapidly than it can be recharged via said charging resistance, thereby tending to cause a decay in the potential between the respective emitter electrodes of said control and auxiliary transistors, which decay when sufficiently advanced disables the operation of said direct-coupled regenerative feedback connection, reconditioning said improved voltage regulator for power-up operation; the improvement comprising:

means responsive to the disabling of said direct-coupled regenerative feedback connection for charging said capacitor to a predetermined level at a faster rate than it can be discharged by the combined conduction of said control and auxiliary transistors should recurrence of said indicative current, due to continuing short-circuiting of said first and second load terminals, again initiate conduction in said control transistor and cause said direct-coupled regenerative feedback connection to be reestablished.

2. In a voltage regulator including first and second terminals for receiving an unregulated voltage; a third terminal between which and said first terminal said regulated voltage is to be provided; a series-pass transistor means having a controlled principal conduction path with first and second ends respectively connected to said second terminal and to said third terminal and having a control electrode; a differential-input error amplifier having inverting and non-inverting input terminals, having an output terminal, and providing an output current dependent on the potential difference between its input terminals; means responsive to such of the output current of said error amplifier as made available to it to develop a control potential applied to the control terminal of said series-pass transistor means; means applying a reference voltage to one of the input terminals of said error amplifier and a predetermined portion of the voltage between said first and said third terminals to the other of the input terminals of said error amplifier; a control transistor having input, common and output electrodes, its common electrode being connected to said first terminal; threshold detection means connected to respond to current flow through the controlled principal conduction path of said series pass transistor means exceeding a prescribed level to supply a current indicative of said excess; means responsive to said indicative current for applying a potential between the common and input electrodes of said control transistor to condition said control transistor for current flow through its output electrode; and means for diverting output current from said error amplifier to the output electrode of said control transistor responsive to the conditioning of said control transistor for current flow through its output electrode; improved means for providing voltage regulator over-current protection comprising — in addition to said control transistor and the afterclaimed foregoing elements — the following:

a capacitor having a first plate connected to said first terminal and having a second plate;

a charging resistance connecting said second terminal to the second plate of said capacitor;

an auxiliary transistor being of complementary conductivity type to said control transistor, having an input electrode to which the output electrode of said control transistor is galvanically connected, having an output electrode galvanically connected to the input electrode of said control transistor, and having a common electrode galvanically connected to the second plate of said capacitor, said control and auxiliary transistors being by virtue of the foreclaimed connections in a regenerative feedback loop connection with each other operative so long as the potential between their respective common electrodes be sufficiently large that their conductions can be sustained, the conduction of said control transistor once initiated responsive to said indicative current giving rise to conduction by said auxiliary transistor, their combined conduction tending to discharge said capacitor more rapidly than it can be recharged via said charging resistance, thereby tending to cause a decay in the potential between their common electrodes which decay in potential when sufficient advanced disables the operation of the regenerative loop connection; and means responsive to the disabling of said regenerative loop connection for charging said capacitor to a predetermined level at a faster rate than it can be discharged by the combined conduction of said control and auxiliary transistors should recurrence of said indicative current, due to continuing short-circuiting of the first and third terminals, again cause conduction in said control transistor and re-establish operation of said regenerative feedback loop connection.

3. An improved voltage regulator as set forth in claim 2 comprising unilaterally conductive means connected between the second end of the conduction path of said series-pass transistor means and the second plate of said capacitor and poled for conducting to charge said capacitor.

* * * * *